United States Patent

Aagaard

[15] 3,688,051

[45] Aug. 29, 1972

[54] CIRCUIT ARRANGEMENT FOR A PULSE-CONTROLLED CONNECTION OF A TELECOMMUNICATION SIGNAL SOURCE TO A TELECOMMUNICATION SIGNAL LOAD

[72] Inventor: Einar Andreas Aagaard, Emmasingel, Eindhoven, Netherlands

[73] Assignee: U.S. Philips Corporation, New York, N.Y.

[22] Filed: May 21, 1970

[21] Appl. No.: 39,283

[30] Foreign Application Priority Data

May 30, 1969 Netherlands..............6908332

[52] U.S. Cl...........179/18 GF, 307/252 J, 340/166 R

[51] Int. Cl...............................................H04q 3/50

[58] Field of Search..............179/18 GF; 340/166 R; 307/252 J

[56] References Cited

UNITED STATES PATENTS

| | | | |
|---|---|---|---|
| 3,251,036 | 5/1966 | Smith | 179/18 GF |
| 3,542,963 | 11/1970 | Aagaard | 179/18 GF |
| 3,311,883 | 3/1967 | Schmitz | 340/166 R |
| 3,564,291 | 2/1971 | Aagaard | 307/252 J |
| 3,218,542 | 11/1965 | Taylor | 307/252 J |

*Primary Examiner*—William C. Cooper
*Assistant Examiner*—William A. Helvestine
*Attorney*—Frank R. Trifari

[57] ABSTRACT

A circuit arrangement for a pulse-controlled connection of a telecommunication signal source to a telecommunication signal load, comprising a semiconductor device having a main current path and a control-current path partially coinciding with the main current path, the main current path forming a low impedance for currents exceeding a given holding current and a high impedance for currents lower than said holding current, the control-current path reducing said holding current for control-currents of a given polarity, in which arrangement said main current path is connected between said source and said load and said control-current path is connected to a control-terminal, a control-pulse source being connected to the control-terminal and a direct-current source being connected to said main current path, wherein between the control-current path and the control-terminal is connected an element whose differential resistance for currents of a polarity opposite said given polarity having a value lower than a given first value has a low value and for currents of said opposite polarity having a value exceeding said given first value has a high value.

5 Claims, 10 Drawing Figures

INVENTOR.
EINAR A. AAGAARD
BY
Frank R. Trifari
AGENT

INVENTOR.
EINAR A. AAGAARD

BY

Frank R. Trifari
AGENT

INVENTOR.
EINAR A. AAGAARD

BY

Frank R Trifari
AGENT

CIRCUIT ARRANGEMENT FOR A PULSE-CONTROLLED CONNECTION OF A TELECOMMUNICATION SIGNAL SOURCE TO A TELECOMMUNICATION SIGNAL LOAD

The invention relates to a circuit arrangement for a pulse-controlled connection of a telecommunication signal source to a telecommunication signal load, comprising a semiconductor device having a main current path and a control-current path partially coinciding with the main current path, the main current path forming a low impedance for currents exceeding a given holding current and a high impedance for currents lower than said holding current, the control-current path reducing said holding current for control-currents of a given polarity, in which arrangement said main current path is connected between said source and said load and said control-current path is connected to a control-terminal, a control-pulse source being connected to the control-terminal and a direct-current source being connected to said main current path.

Circuit arrangement of the kind set forth are employed inter alia in electronic speechpath networks of automatic telephone exchanges.

A known crosspoint element for electronic switching networks is formed by a pnpn-transistor with a base resistor. By means of this known crosspoint element it is difficult to satisfy the practical requirements with respect to a high cross-talk damping, a small spread in the transmission damping and a low level of the noise resulting from the control-pulses.

The invention has for its object to provide a new design of the circuit arrangement of the kind set forth capable of satisfying better than hitherto the requirements of practice and more particularly a circuit arrangement having a very high crosstalk damping, a very small spread in the transmission damping and a very low noise level.

The circuit arrangement according to the invention is characterized in that between the control-current path and the control-terminal an element is connected whose differential resistance for currents having a polarity opposite said given polarity and having a value lower than a given first value has a low value and for currents of said opposite polarity and having a value exceeding said given first value has a high value.

The invention and its particular advantages will be described more fully with reference to the figures. Therein:

Figures 3A, 3B, 3C, 3D, 4, 4A:
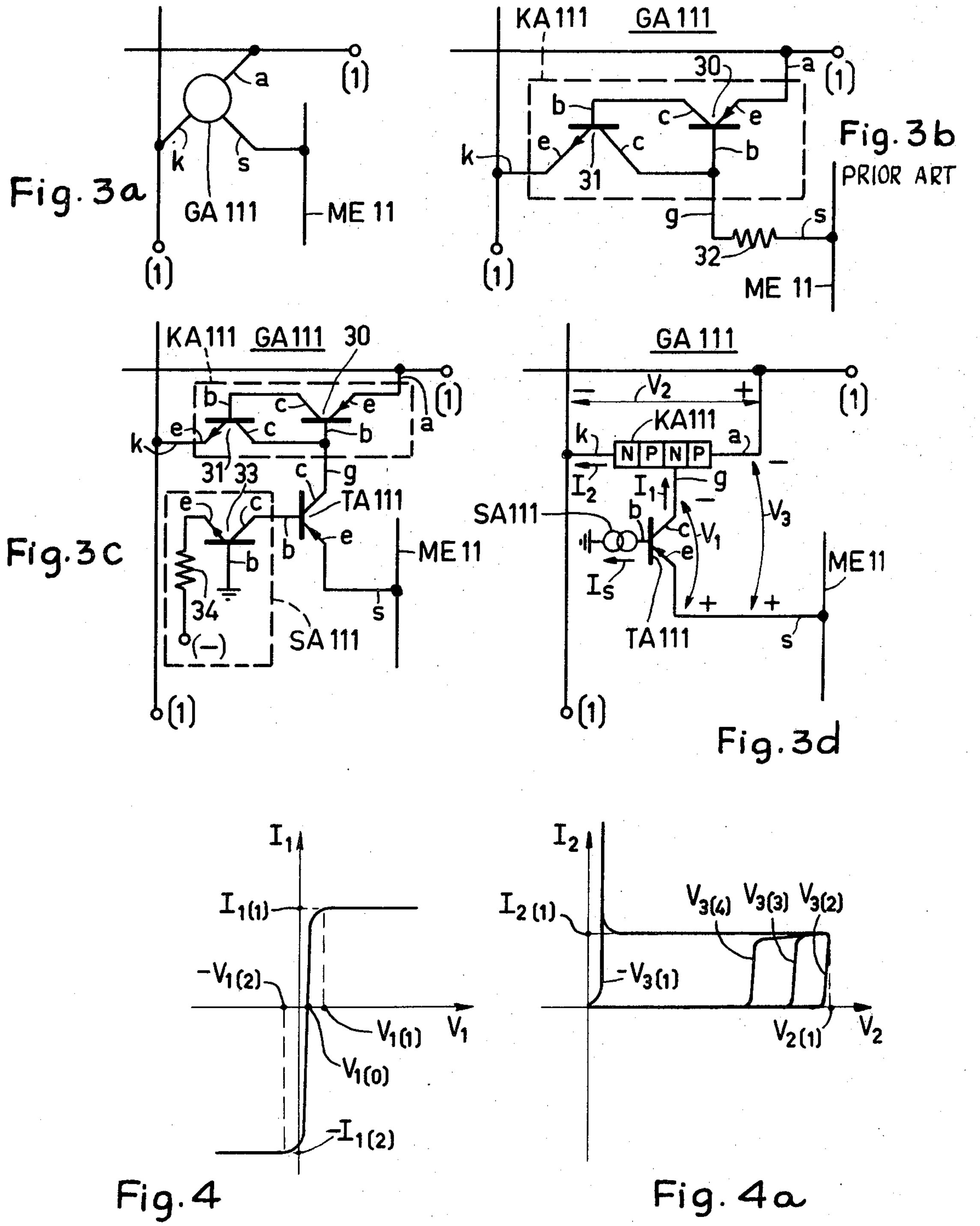

FIG. 3*a* illustrates symbolically a cross-point element.

FIG. 3*b* shows a known cross-point element.

FIGS. 3*c* and *d* show one embodiment and the symbolic representation of a cross point coupling element in accordance with the invention.

FIGS. 4*a* and *b* illustrate current-voltage characteristic curves for explaining the operation of the cross-point element of FIGS. 3*c* and *d*.

Figure 1:
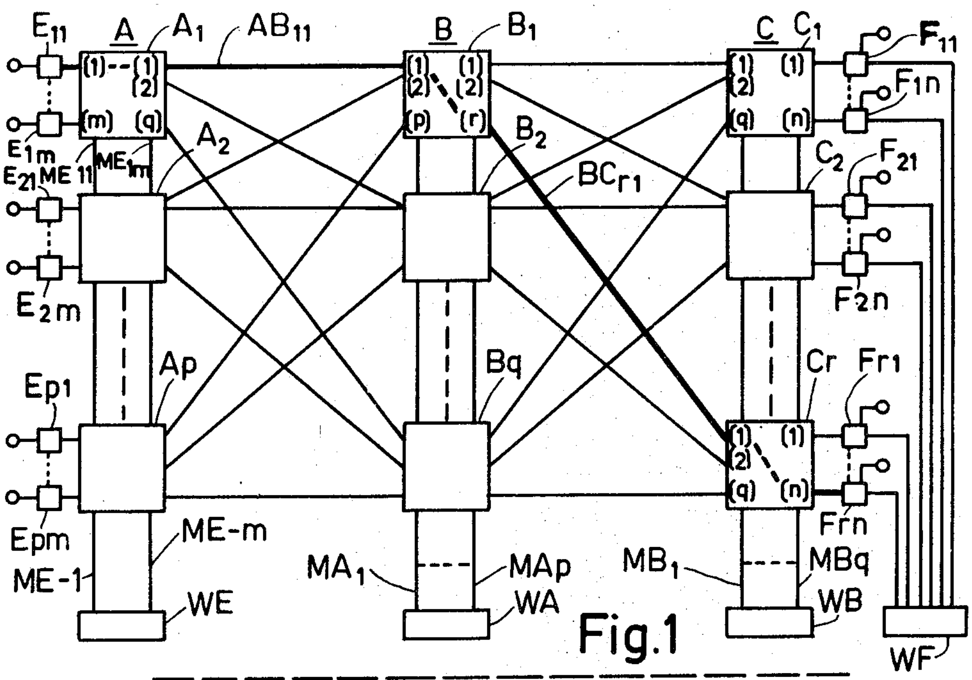
FIG. 1 shows the construction of a multi-stage switching network using matrix switches.
Figures 5, 6:
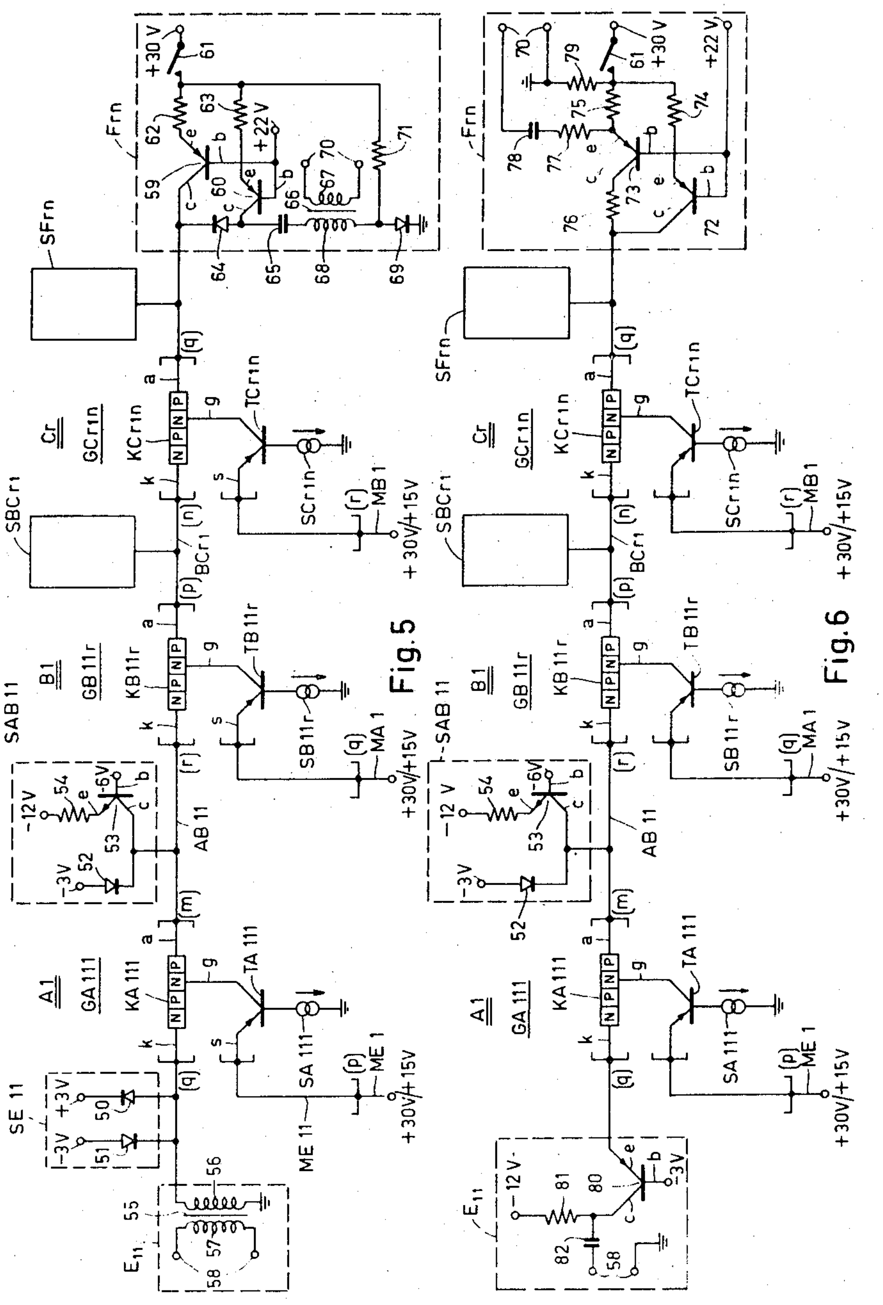

FIG. 5 shows one embodiment of a communication path through the switching network of FIG. 1 and FIG. 6 shows a second embodiment of a communication path through a switching network of FIG. 1.

FIG. 1 shows a switching network having three stages A, B, and C, which is typical for the switching networks to which the invention can be applied. The stage A comprises the matrix switches A1, A2, . . ., A+, each having *m* and *q* outputs. Each output of a matrix switch of the stage A is connected through an intermediate line to an input of a matrix switch of the stage B associated with said output, said stage B thus having *q* matrix switches B1, B2. . . B*q*. Each of these matrix switches comprises *p* inputs, corresponding with the *p* matrix switches of stage A, and *r* outputs. In a similar way as described above for the stage A said outputs are connected via intermediate lines to the inputs of stage C. Stage C thus comprises *r* matrix switches C1, C2, . . ., C*r*. Each matrix switch of stage C comprises *q* inputs corresponding to the *q* matrix switches of stage B and *n* outputs.

The inputs of the matrix switches A1, A2,. . . A*p* form the inputs of the switching network and the outputs of the matrix switches C1, C2, . . . C*r* from the outputs of the switching network.

To the inputs of the switching network are connected the terminal devices E11, . . . E*pm* and to the outputs of the switching network are connected the terminal devices F11, . . ., F*rn*. These terminal devices may be line terminating devices for the incoming and outgoing telephone communications.

Figure 2:
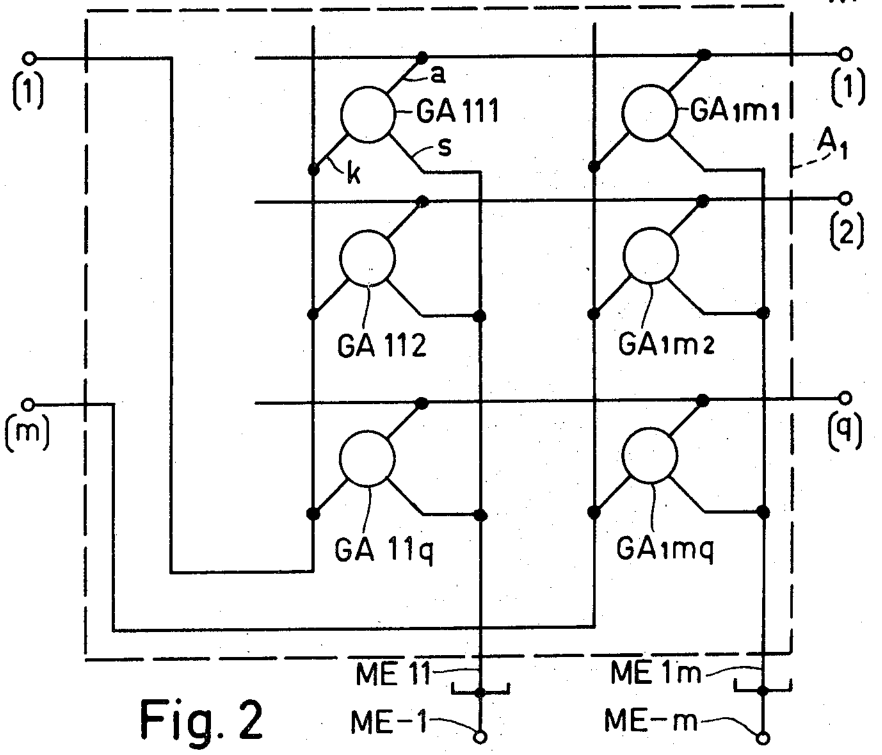
FIG. 2 shows the construction of a matrix switch having cross-point elements.

The matrix switches are of similar construction. FIG. 2 shows in detail the construction of the matrix switch A1. This matrix switch comprises *m* columns forming the inputs of the matrix switch and *q* rows forming the outputs thereof. The columns and rows form a two-dimensional array (matrix) of crosspoint. Each crosspoint has associated therewith an electronic crosspoint element having three poles. FIG. 2 shows the crosspoint elements GA111, GA112 and GA11*q* at the crosspoint of column (1) with the rows (1), (2) and (q) and the crosspoint elements GA1*m*1, GA1*m*2 and GA1*mq* at the crosspoints of column (*m*) with the rows (1), (2) and (*q*). The poles are designated by *a*, *k* and *s* as is indicated in FIG. 2 at the crosspoint element GA111. The poles *s* of the crosspoint elements of column (1) are connected to the (column) marking conductor ME11 and the poles *s* of the coupling elements of column (*m*) are connected to the (column) marking conductor ME1*m*. The same applies to the other columns (not shown) of matrix switch A1.

In the stage A (FIG. 1), as well as in the other stages, the marking conductors of the matrix switches are multiplied so that each coupling stage comprises only as many marking conductors as there are columns in a single matrix switch. The multiple-connected marking conductors are designated in FIG. 1 by ME–1,. . . ME–*m* for the stage A, by MA1, . . .,MA*p* for the stage B and by MB1, . . . MB*q* for the stage C. Thus each marking conductor is associated with a column of each matrix switch of the stage concerned. The multiple-connection is constructed so that the marking conductors of the columns having the same number are connected to each other. In this way, for example, marking conductor ME–1 is associated with the columns (1) of the matrix switches A1, A2,. . . A*p*; marking conductor ME–*m* is associated with the columns (*m*). Marking conductor MA1 is associated with the columns (1) of the matrix switches B1, B2,. . . B*q*, i.e., the columns connected to the outputs of matrix switch A1. Marking conductor MA$p$ is associated with the columns ($p$) i.e. the columns connected to the outputs of matrix switch A$p$. In a similar manner the marking conductors MB1, . . . MB$q$ are associated with the matrix switches B1, . . . B$q$.

In FIG. 1 the solid line represents a communication path between the terminal device E11 and the terminal device F$rn$. The terminal device E11 is connected to column (1) of matrix switch A1 and the terminal device F$rn$ is connected to the row ($n$) of matrix switch C$r$. The communication path passes across the crosspoint between column (1) and row (1) of matrix switch A1 (crosspoint element GA111, FIG. 2) via the intermediate line AB11 to column (1) of matrix switch B1 and via the crosspoint between column (1) and row ($r$) and then via the intermediate line BC$r$1 to column (1) of matrix switch C$r$. From said last column the communication path passes across the crosspoint between said last column and row ($n$) to the terminal device F$rn$. The course of the communication path through the matrix switches is indicated in FIG. 1 by broken lines between the inputs and outputs concerned.

The marking conductors ME–1,. . . ,ME–$m$ are connected to a selector WE, which is capable upon instruction of applying a marking pulse to a selected marking conductor. The marking conductors MA1,. . . ,MA$p$ are connected to a corresponding selector WA and the marking conductors MB1, . . . ,MB$q$ are connected to a corresponding selector WB.

The terminal devices F11,. . . F$rn$ are connected to a selector WF, which is capable of closing a marking contact in a selected terminal device. As will be explained more fully hereinafter, a marking voltage is applied to the row concerned when the marking contact is closed. When, for example, in the terminal device F$rn$ the marking contact is closed, a marking voltage is applied to row ($n$) of matrix switch C$r$. This marking voltage will be termed hereinafter the row marking voltage. For the establishment of the communication path defined above marking pulses are applied to the marking conductors MB1, MA1 and ME–1 after the marking contact in the terminal device F$rn$ is closed.

The marking pulse of marking conductor MB1 arrives at the poles $a$ of all crosspoint elements of all columns (1), but only at the crosspoint between column (1) and row ($n$) of matrix switch C$r$ it coincides with the row marking voltage. As will be explained in detail hereinafter, only the last-mentioned crosspoint element becomes conducting and the row marking voltage is passed via the crosspoint element and the intermediate line BC$r$1 to the row ($r$) of matrix switch B1. In the stage B the same process as described for the coupling stage C causes the row marking voltage to pass via the conductive crosspoint element between column (1) and row ($r$) of matrix switch B1 and then via the intermediate line AB11 to the row (1) of matrix switch A1. In the stage A the same process is repeated and the communication path with the terminal device E11 is established at the same time that the crosspoint element between column (1) and row (1) of matrix switch A1 becomes conductive.

Switching networks of the kind set forth comprising electronic crosspoint elements belong to the prior art, for example as disclosed by British Pat. specification No. 849,873. In the prior art the crosspoint elements are formed each by a pnpn-transistor whose emitter and collector are connected to the row and the column of the relevant crosspoint and whose base is connected through a base resistor to the column-marking conductor. For pnpn-transistors and semiconductor devices of analogous properties a variety of terms are used nowadays, for example: controlled rectifier, SCR, Thyristor, Hooktransistor, compound transistor, etc. These semiconductor devices have a common property in that they comprise a main current path and a control-current path partially coinciding with the main current path, the latter forming a low impedance for currents exceeding a given holding current and a high impedance for currents lower than said holding current, and by passing a control-current of suitable polarity through the control-current path the main current path can be driven into the state of low impedance, which state is maintained when the current in the main current path exceeds the holding current.

With reference to FIG. 3 the crosspoint element of the prior art and an improved crosspoint element in accordance with the present invention will be described in detail. All crosspoint elements are constructed in the same way. FIG. 3$a$ shows in the same fashion as in FIG. 2 the crosspoint element GA111 between column (1) and row (1) of matrix switch A1. FIG. 3$b$ shows the embodiment of the crosspoint element of the prior art. In this embodiment the crosspoint element GA111 comprises a semiconductor device KA111 having an anode $a$, a cathode $k$ and a gate $g$ and comprises a resistor 32, which connects the gate $g$ to pole $s$. The semiconductor device KA111 is formed by a pnp-transistor 30 having an emitter $e$, a collector $c$ and a base $b$ and by an npn-transistor 31 also having an emitter $e$, a collector $c$ and a base $b$. The collector of transistor 30 is connected to the base of transistor 31, whose collector is connected to the base of transistor 30. The anode $a$ is connected to the emitter of transistor 30, the cathode $k$ to the emitter of transistor 31 and the gate $g$ to the base of transistor 30. The main current path of the semiconductor device KA111 lies between the anode $a$ and the cathode $k$ and the control-current path lies between the anode $a$ and the gate $g$. When the row marking voltage is present at the row (1) and a negative marking pulse is applied to the marking conductor ME11, a control-current flows from anode $a$ to gate $g$ via the emitter-base junction of transistor 30. This current drives transistor 30 into the conductive state so that from the collector a current passes to the base of transistor 31, which becomes conductive so that via the collector a current flows from the base of transistor 30. When this regenerative process has once started, the semiconductor device KA111 automatically passes to the saturation state, in which the main current path has a very low series resistance.

As stated above, each marking conductor in the stages A, B and C of the switching network of FIG. 1 is multiple-connected across all matrix switches in the stage concerned. It is thus ensured that the number of required marking conductor is at a minimum. A marking pulse then arrives, however, not only at the desired column of the desired matrix switch, but also at a column of each other matrix switch in the stage concerned. If a communication path has been established through one of the latter columns, one of the crosspoint elements of the said column is conducting. The marking pulse then finds its way via the base resistor of the conducting crosspoint element (32, FIG. 3*b*) to the existing communication path and produces a disturbance therein. The sum of all these disturbances give rise to noise in the established communication paths.

Normally the marking conductor ME11 (FIG. 3*b*) has a (positive) voltage which cuts off the semiconductor device KA111 when it is not occupied for a communication path. The voltage of the marking conductor ME11 renders the voltage of the base *b* of transistor 30 positive relative to the voltage of the emitter *e*, so that the emitter-base junction of transistor 30 is driven in the reverse direction. In this state this emitter-base junction forms a given capacitance between row (1) and gate *g*. The base-collector junction of transistor 31 forms a given capacitance between gate *g* and base *b* of transistor 31. This base is connected via the base-emitter junction of transistor 31 to column (1) and this base-emitter junction is driven in the forward direction by the voltage of marking conductor ME11 and conveys the leakage current of cathode *k*. The base-collector capacitance of transistor 31 is then effective between column (1) and gate *g*.

When column (1) and row (1) form part of different communication paths, crosstalk will occur via said internal transistor capacitances. The crosstalk attenuation is determined to a high extent by the value of resistor 32. The lower this value, the higher is the crosstalk damping. A low value of resistor 32 is, however, not compatible with the requirement of a low transmission damping in the conductive state of the crosspoint element and with the requirement of a low noise level.

FIG. 3*c* shows the construction of the crosspoint element improved in accordance with the invention. The semiconductor device KA111 of FIG. 3*b* is also comprised therein and it is connected in the same manner as in FIG. 3*b* between row (1) and column (1). In the improved embodiment the emitter-collector current path of a pnp-transistor TA111 is connected between gate *g* of semiconductor device KA111 and pole *s* of the crosspoint element. Transistor TA111 comprises an emitter *e*, a base *b* and a collector *c*. The collector *c* is connected to gate *g* and the emitter *e* is connected to pole *s*. The base *b* of transistor TA111 has connected to it a current source SA111, which adjusts the base current of transistor TA111 to a substantially constant value independent of the voltage at pole *s* and independent of the state of the semiconductor device KA111.

The current source SA111 comprises an npn-transistor 33 having an emitter *e*, a base *b* and a collector *c*. The emitter *e* is connected via an emitter resistor 34 to a negative supply point (−) and the base *b* is directly connected to earth. The collector *c* of transistor 33 is connected to the base *b* of transistor TA111. The emitter current of transistor 33 has a constant value, which is determined by the resistor 34 and the voltage of the negative supply point (1). The collector current is within wide limits independent of the collector voltage so that the collector current has a substantially constant value within wide limits.

FIG. 3*d* shows again the crosspoint element of FIG. 3*c*, with other symbols arrows indicating voltages and currents essential for the explanation of the operation. Current source SA111 is represented by the conventional symbol for a current source formed by two intersecting circles and an arrow indicating the direction of the current. Semiconductor device KA111 is represented by a block divided into four portions. Viewed from the outermost portion P and from right to left these portions correspond to the emitter *e* of transistor 30, the base *b* of transistor 30 and the collector *c* of transistor 31, the collector *c* of transistor 30 and the base *b* of transistor 31 and the emitter *e* of transistor 31.

FIG. 4*a* illustrates the relationship between the voltage V1 and the current I1 and FIG. 4*b* illustrates the relationship between the voltage V2 and the current I2 for different values of the voltage V3.

The values I1 (1) and I1 (2) are determined by:

$$I1\,(1) = Bf \cdot Is,$$

$$I1\,(2) = (Br + 1) \cdot Is,$$

wherein *Bf* designates the "forward" current amplification factor, and *Br* the "reverse" current amplification factor of transistor TA111 and *Is* designates the current of the source SA111. The characteristic curve of FIG. 4*a* relates to a transistor having $Bf \approx 0.8$ and $Br \approx 0.4$.

In a practical embodiment the current of the current source SA111 may have the value $Is = 10\ \mu A$. The "knee" voltages V1(1) and −V1(2) have an absolute value of less than 1 Volt.

V2(1) is the breakdown voltage of transistor 31. The voltages V3(4), V3(3) and V3(2) are positive and V3(4) > V3(3) > V3(2) and V3(2)≈0 Volt. The voltage −V3(1) is negative and −V3(1)≈Volt. For positive currents I2 > I2(1) the characteristic curves of V3(4), V3(3) and V3(2) reduce to one characteristic curve. This single characteristic curve corresponds with the characteristic curve of a diode driven in the forward direction in series with the emitter-collector current path of a saturated transistor. The current *I2*(1) is termed the holding current.

When the semiconductor device KA111 is cut off, a gate leakage current will flow to gate *g*. The value *I1*(1) is determined by the choice of B*f* in respect of I*s* so that the gate leakage current is lower than I1(1). The voltage V1 then lies in the range between V1(0) and V1(1).

For negative values of the current I1 the holding current of semiconductor device KA111 decreases and becomes zero at the voltage V3 = V3(1). The value I1(2) is determined by the choice of the factor Br with respect to I*s* so that the current I1, at which the holding current of semiconductor device KA111 becomes zero, has an absolute value lower than I1(2).

FIG. 5 shows an embodiment of the communication path indicated in FIG. 1 by a solid line between the terminal devices E11 and F*rn* using crosspoint elements in the embodiment shown in FIGS. 3*c* and 3*d*.

To column (1) of matrix switch A1 is connected a voltage-limiting circuit SE11, which limits the voltage of the communication path to +3 Volt on the one hand and to −3 Volt on the other hand. This circuit comprises a diode 50, the anode of which is connected to column (1) and the cathode of which is at a voltage of +3Volt and a diode 51, the cathode of which is connected to column (1) and the anode of which is at a voltage of −3 Volt.

Identical current source circuits are connected to the intermediate lines of the coupling field and to the rows of the matrix switches of stage C. For the intermediate lines AB11 and BC*r*1 and the row(*n*) of matrix switch C*r* these current source circuits are designated in FIG. 5 by SAB11, SBC*r*1 and SF*rn*. The current source circuit SAB11 comprises a diode 52, the anode of which is connected to −3 Volt and the cathode of which is connected to the intermediate line AB11 and an npn-transistor 53 having an emitter *e*, a base *b* and a collector *c*. The emitter e is connected by way of an emitter resistor 54 to a voltage of −12 Volt, the base *b* is at a voltage of −6 Volt and the collector *c* is connected to the intermediate line AB11. In connection with the voltages of −6 Volt and −12 Volt the emitter resistor 54 adjusts the emitter current. When the intermediate line AB11 is not occupied for a communication and is therefore free, the collector current of transistor 53 passes through the diode 52 and the intermediate line AB11 is held at a voltage of −3 Volt. With a voltage of the intermediate line AB11 higher than −3 Volt, the circuit SAB11 behaves like a current source with a fixed current. The same applies to the other intermediate lines of the switching network and the outputs thereof.

The terminal device E11 comprises a transformer 55, the primary winding 56 of which is connected between column (1) of matrix switch A1 and earth and the secondary winding 57 of which is connected to the pair of terminals 58—58. This pair of terminals serves for connecting a transmission line for telecommunication signals for example, a telephone line. The winding 56 establishes a direct-current connection between the column (1) of matrix switch A1 and earth, through which direct-current connection the holding current of the communication path can flow.

The terminal device F*rn* comprises the pnp-transistors 59 and 60, each having an emitter *e*, a base *b* and a collector *c*. The emitter *e* of transistor 59 is connected through a resistor 62 to a pole of marking contact 61, the other pole of which is at a voltage of +30 Volt. The base *b* of transistor 59 is at a voltage of +22 Volt and the emitter *e* is connected to row (*n*) of matrix switch C*r*.

The emitter *e* of transistor 60 is connected by way of a resistor 63 to the same pole of marking contact 61 as the emitter *e* of transistor 59. The base *b* of transistor 60 is at +22 Volt and the collector is connected through a diode 64 to row (*n*) of matrix switch C*r*.

Between the anode of diode 64 and earth is connected a current circuit including in order of succession a DC-blocking capacitor 65, the secondary winding 68 of a transformer 66 and a diode 69. The primary winding 67 of transformer 66 is connected to a pair of terminals 70—70, which serves for connecting a transmission line for telecommunication signals, for example, a telephone line. The anode of diode 69 is connected via a resistor 71 to the same pole of marking contact 61 as the emitters of the transistors 59 and 60.

The diodes 64 and 69 isolate the secondary winding 68 from row (*n*) of matrix switch C*r*, when the contact 61 is not closed and thus prevent the application of telecommunication signals appearing at the pair of terminals 70—70 to the row concerned.

In order to establish the communication path described between the terminal devices E11 and F*rn*, the marking contact 61 in the terminal device F*rn* is closed and negative marking pulses are applied to the marking conductors MB1, MA1 and ME-1. A negative marking pulse reduces the voltage of a marking conductor temporarily from +30 Volt to +15 Volt. The voltage of an intermediate line not associated with a conducting communication path is −3 Volts. The voltage of an intermediate line associated with a conducting communication path lies between −3 Volt and +6 Volt.

The closure of marking contact 61 causes a voltage of +22 Volt (the row marking voltage) to be applied to the row (*n*) of matrix switch C*r*. The transistors 59 and 60 are driven in the saturation state because the current of the current source circuit SF*rn* is only a fraction of the emitter currents of the transistors 59 and 60. As a result the collectors of said transistors and hence also the row (*n*) of matrix switch C*r* obtain substantially the same voltage as the bases of these transistors. The current source circuit SF*rn* ensures that the voltage of +22 Volt at the row concerned is attained with a given minimum flank steepness. The application of a marking pulse to the marking conductor MB1 reduces the voltage of the column marking conductor of column (1) of matrix switch C*r*. This results in that the voltage V3(FIG. 3*d*) between the poles *s* and *a* of the crosspoint element GC*r*1*n* between column (1) and row (*n*) of matrix switch C*r* attains a value of −7 Volts. Transistor TC*r*1*n* then conveys a current I1 = −I1 (2) (FIGS. 3*d* and 4*a*), which reduces to zero the holding current of semiconductor device KC*r*1*n*. The main current path of semiconductor device KC*r*1*n* then forms a low series resistance for the row marking voltage of row(*n*) of matrix switch C*r*, as a consequence of which the row marking voltage is transmitted to the intermediate line BC*r*1. Current source circuit SBC*r*1 ensures that after the crosspoint element GC*r*1*n* has become conducting a given minimum current passes through the main current path of semiconductor device KC*r*1*n*, as a result of which the voltage of the intermediate line BC*r*1 attains the value of +22 Volt with a given minimum flank steepness. In the stage B the coincidence between the marking pulse of the marking conductor MA1 and the row marking voltage of the row (*r*) of matrix switch B1 causes the crosspoint element GB11*r* to become conducting. Thus the row marking voltage is transmitted to the intermediate line AB11. The current source circuit SAB11 performs the same function as the current source circuit SBC*r*1. In the stage A the coincidence between the marking pulse at the marking conductor ME–1 and the row marking voltage of the row (1) of matrix switch A1 causes the crosspoint element GA1111 to become conducting.

The cathode *k* of semiconductor device KA111 of crosspoint element GA111 is connected to earth via row (1) of matrix switch A1 and the primary winding 56 of transformer 55 of terminal device E11. When crosspoint element GA111 becomes conducting, the communication path is adjusted substantially to earth potential, which results in an increase in current through the series-connected main current paths of the semiconductor devices KA111, KB11*r* and KC*r*1*n*. The marking pulses across the marking conductors ME1, MA1 and MB1 are terminated after the crosspoint element GA111 has become conducting.

Due to the crosspoint element GA111 becoming conducting, the collector currents of the transistors 59 and 60 of the terminal device F*rn* increase up to the values adjusted by the emitter resistors 62 and 63 in connection with the voltages of +30 Volt and +22 Volt. The transistors 59 and 60 then behave like a current source.

The state of a conducting crosspoint element, typically the crosspoint element GA111, (FIGS. 5 and 3d) is as follows. The anode *a* and the cathode *k* of semiconductor device KA111 are substantially at earth potential and from the anode to the cathode flows a current substantially equal to the sum of the collector currents of the transistors 59 and 60 of the terminal device F*rn*. Pole *s* has a voltage of + 30 Volt, which results in a voltage V1 (FIG. 3*d*) of +30 Volt. This voltage adjusts the transistor TA111 to the portion of the characteristic curve of FIG 4*a* extending parallel to the positive V1-axis. In this portion of the characteristic curve the current I1 has the value I1(1) and the collector of transistor TA111 represents a high differential resistance for the semi-conductor device KA111. The current I1 = I1(1) produces an increase of the holding current of semiconductor device KA111 up to the value I2(1) (FIG. 4*b*) which lies at any rate below the value of the current flowing from the anode to the cathode by suitable adjustment of the latter current.

If during marking of a further communication path a marking pulse is applied to marking conductor ME–1, the voltage V1 (FIGS. 3*d* and 4*a*) of the conducting crosspoint element GA111 drops to +15 Volt, but the current I1 (FIG. 4*a*) does not vary. The result is that no disturbances can occur in an existing communication path due to marking pulses. In this way the phenomenon of marking pulse noise in electronic speech paths is completely avoided.

For a cut-off crosspoint element, in which only the pole *a* or only the pole *s* is marked or in which neither of the two poles are marked, the voltage V3(FIG. 3*d*) is positive. The voltage V3 has in these various cases a value of about +8 Volt, +15 Volt and +30 Volt respectively. In the latter two cases a change of at the most −9 Volt may occur, when pole *a* is connected to a "busy" intermediate line whose voltage lies between −3 Volt and +6 Volt. In all these cases the semiconductor device of the crosspoint element remains cut off. As described above, the gate leakage current of the semiconductor device is lower than I1(1) (FIG. 4*a*) so that transistor TA1111 is adjusted to the portion of the characteristic curve of FIG. 4*a* which extends parallel to the positive I1-axis. In this portion of the characteristic curve the collector of transistor TA111 (FIG. 3*d*) represents a low differential resistance for the semiconductor device KA111.

Telecommunication signals applied to the pair of terminals 70—70 produce a signal voltage across the secondary winding 68 of transformer 66. This signal voltage is applied between row (*n*) of matrix switch C*r* and earth via the conducting diodes 64 and 69 and capacitor 65. The diode 64 is driven in the forward direction by the collector current of transistor 60, which current limits the negative signal current to a given maximum. The diode 69 is driven in the forward direction by the current traversing resistor 71, which currents limits the positive signal current to a given maximum. The emitter resistor 62 of transistor 59 is determined with respect to the voltages of +30 Volt and +22 Volt so that the collector maintains a current through the conducting coupling elements, which exceeds the holding current of said coupling elements.

The signal voltage applied between row(*n*) of matrix switch C*r* and earth produces via the low-ohmic communication path a signal current through the primary winding 56 of transformer 55 of the terminal device E11 so that a signal voltage appears at the pair of terminals 58—58. Conversely, telecommunication signals applied to the pair of terminals 58—58 produce a signal current through the secondary winding of transformer 66 of the terminal device F*rn* so that a signal voltage appears at the pair of terminals 70—70.

The transmission damping of a conducting crosspoint element (FIG. 3*d*) in the arrangement of FIG. 5 is determined by the series resistance of the main current path of the semiconductor device KA111 and the collector differential resistance of transistor TA111. Since this differential resistance in a conducting crosspoint element has a very high value, its contribution to the transmission damping is very slight.

For a cut-off crosspoint element (FIG. 3*d*) the stray capacitances between anode *a* and gate *g* and between cathode *k* and gate *g* are an important source of cross-talk of signals between cathode and anode. The cross-talk damping due to said form of cross-talk is determined by the ratio between the capacitative stray impedances and the collector differential resistance of transistor TA111. For a cut-off crosspoint element this differential resistance has a very low value, resulting in a very high cross-talk damping. Owing to the saturated state and its inertia the transistor TA111 is capable of conducting transient, capacitative currents without increase in resistance, even if the instantaneous value of the collector current I1 exceeds I1(1). This is advantageous when telecommunication signals having steep flanks are transmitted, which may be the case with binary data signals and videophone signals.

The limiting circuit SE11, connected to column (1) of matrix switch A1, limits the telecommunication voltages appearing at the upper end of winding 56 to +3 Volt on the one hand and to −3 Volt on the other hand so that taking into account a voltage drop of about 1 Volt of a conducting crosspoint element the voltage of a conducting communication path lies between +6 Volt and −3 Volt.

The communication path is maintained in the low-ohmic state under the control of the closed marking contact 61 in the terminal device F*rn*. When contact 61 is opened, the current passing through the series-connected crosspoint elements is interrupted so that these crosspoint elements automatically change over to the cut-off state, the communication path being thus interrupted.

After marking contact 61 is opened, the intermediate line BC*r*1 is traversed by the sum of the leakage currents of the crosspoint elements of column (1) of matrix switch C*r*. These leakage currents are absorbed by the current source circuit SBC*r*1 so that they are held away from row (*r*) of matrix switch B1. The conducting crosspoint element GB11*r* can then not be held in the conductive state, after marking contact 61 is opened, by the leakage current passing through the intermediate line BC*r*1 so that it will reliably change over to the cut-off state. Thus the restrictions imposed on the holding current I2(1) (FIG.4*b*) are materially relieved.

FIG. 6 illustrates a communication path for one-way signal transmission, in which the advantages of the improved crosspoint element are utilized to the upmost extent. This communication path differs from that of FIG. 5 in the embodiments of the terminal devices E11 and F*rn*. In FIG. 6 the same references are used as in FIG. 5 for designating corresponding parts.

The terminal device Frn (FIG. 6) comprises the pnp-transistors 72 and 73, each having an emitter *e*, a base *b* and a collector *c*. The emitter *e* of transistor 72 is connected through a resistor 74 to a pole of marking contact 61, the other pole of which is at +30 Volt. The collector *c* of transistor 72 is connected to row (*n*) of matrix switch C*r* and the base is at a voltage of +22 Volt. The transistor 72 has the same function and operation as transistor 59 of FIG. 5. The emitter *e* of transistor 73 is connected through a resistor 75 to the same pole of marking contact 61 as the emitter *e* of transistor 72. The collector *c* of transistor 73 is connected through resistor 76 to row (*n*) of matrix switch C*r* and the base *b* is connected to the same voltage of +22 Volt as the base of transistor 72.

The pair of terminals 70—70 of terminal device F*rn* is connected to earth and through the series combination of a DC-blocking capacitor 78 and a resistor 77 to the emitter *e* of transistor 73.

The pole of marking contact 61, to which the emitters of transistors 72 and 73 are connected, is connected through a resistor 79 to earth. Via this resistor the transistors 72 and 73 are cut off, when the marking contact 61 is open.

The terminal device E11 (FIG. 6) comprises a transistor 80 having an emitter *e*, a base *b* and a collector *c*. The emitter *e* is connected to column (1) of matrix switch A1. The collector *c* is connected via a resistor 81 to a voltage of −12 Volt and the base *b* is at a voltage of −3 Volt. The pair of terminals 58—58 is connected to earth and via a DC-blocking capacitor 82 to the collector of transistor 80.

The closure of marking contact 61 and the application of marking pulses to the marking conductors MB1, MA1 and ME-1 establish the communication path in the same manner as described with reference to FIG. 5. After the crosspoint element GA111 has become conducting, transistor 80 in terminal device E11 will become conducting and the voltage of the communication path will drop to about −3 Volt. Transistor 72 then gets out of the saturation state and conveys a constant current through the communication path, which is thus kept in the operated condition after the marking pulses have disappeared.

In view of the voltage of + 30 Volt and +22 Volt the resistor 75 adjusts the emitter current of transistor 73 to a working point. Telecommunication signals applied to the pair of terminals 70—70 produce positive and negative signal variations of the emitter current of transistor 73. The working point of transistor 73 is determined so, that with telecommunication signals of nominal level the emitter current variations produce proportional collector current variations. The collector current variations of transistor 73 are transmitted via the communication path to the emitter of transistor 80 in the terminal device E11, where they produce proportional variations of the collector current of transistor 80 so that a signal voltage is produced at the pair of terminals 58—58. Due to the high internal differential resistance of the transistors TA111, TB11*r* and TCR1*n* there is no loss of signal current.

The collector of transistor 73 supplies signal currents which are independent, within wide limits, of the collector voltage so that for these signal currents it has the nature of a current source having a high internal differential resistance. Thus a transmission damping from the terminal device F*rn* to the terminal device E11 is realized, which is independent of the series resistances of the crosspoint elements, which results in an extremely small spread in the transmission damping between two arbitrary terminal devices.

Owing to the high internal impedance of the telecommunication signal source also the influence of inductive cross-talk from parallel communication paths is reduced.

The load of the communication path is formed by the low-ohmic emitter-base junction of transistor 80. The voltage variations along the communication path during the signal transmission are thus very slight so that the capacitative cross-talk to parallel communication paths is reduced.

Referring again to FIGS. 3*d* and 4*a* it should be noted that the portion of the I1–V1-characteristic curve located beneath the V1-axis only plays a part when the crosspoint element is marked by the row marking voltage and the column marking pulse. For all other cases only the portion of the I1–V1-characteristic curve located above the V1-axis is of importance. For a high cross-talk damping and a low transmission damping and, in addition, for a low marking noise level it is essential that the characteristic curve for positive currents I1 should have a steep course up to the value I1(1) corresponding to a low differential resistance and a flat course for values exceeding I1(1) corresponding to a high differential resistance. The value I1(1) is determined so that it exceeds the maximum gate leakage current of a cut-off crosspoint element.

For rendering a crosspoint element rapidly conductive, it is important that the characteristic curve for negative currents I1 should have a steep course up to the value I1(2) corresponding to a low differential resistance and a flat course from said value corresponding to a high differential resistance in order to limit the marking current. The value I1(2) is determined so that it exceeds the value of the gate current at which the holding current becomes zero.

It will be obvious that elements having a characteristic curve as shown in FIG. 4*a* may be embodied in various ways and the invention is therefore not restricted to the advantageous form of the elements shown in FIG. 3*c*. It will furthermore be obvious that since only the portion of the characteristic curve located above the V1-axis is determinative of the advantageous properties of the high cross-talk damping and the low transmission damping and the low marking noise, the invention also relates to elements whose characteristic curve portion for negative currents I1 deviates from the characteristic curve shown in FIG. 4a.

What is claimed is: current ,

1. A circuit arrangement for a pulse-connection of a telecommunication signal source to a telecommunication signal load, comprising a semiconductor device having a main current path and a control-current path partially coinciding with the main current path, the main current path forming a low impedance for currents exceeding a given holding current and a high impedance for currents lower than said holding current, the control-current path reducing said holding current for control-currents of a given polarity, means for connecting said main current path between said source and said load, means for connecting said control-current path to a control-terminal, means for connecting a control-pulse source to the control-terminal, means for connecting a direct-current source to said main current path, and an element connected between the control-current path and the control-terminal having a low differential resistance for currents of a polarity opposite said given polarity and having a value lower than a given first value and a high differential resistance for currents of said opposite polarity and having a value exceeding said given first value, said low differential resistance comprising a differential resistance of such value that the current in the control-current path may fluctuate above and below the holding current in response to differential changes in the voltage on the control terminal, said high differential resistance comprising a differential resistance of such value that differential changes in the voltage on the control terminal produce substantially no differential changes of current in the control-current path.

2. A circuit arrangement as claimed in claim 1, wherein for currents of said given polarity having a value lower than a given second value said element has a low differential resistance and for currents of said given polarity having a value exceeding said given second value the element has a high differential resistance.

3. A circuit arrangement as claimed in claim 2, wherein said element is formed by a current source in conjunction with a transistor having an emitter, a base and a collector, the base being connected to the current source, the emitter being connected to the control-terminal and the collector being connected to the control-current path of the semiconductor device.

4. A circuit arrangement as claimed in claim 1, wherein the source of telecommunication signals is formed by a source having a high internal differential resistance.

5. A circuit arrangement as claimed in claim 1, wherein the telecommunication load is formed by a load having a low internal differential resistance.

* * * * *

PO-1050
(5/69)

UNITED STATES PATENT OFFICE
CERTIFICATE OF CORRECTION

Patent No. 3,688,051 Dated August 29, 1972

Inventor(s) EINAR ANDREAS AAGAARD

It is certified that error appears in the above-identified patent and that said Letters Patent are hereby corrected as shown below:

Col. 6, line 33, "Volt" should be --0.8 V--.

Signed and sealed this 13th day of March 1973.

(SEAL)
Attest:

EDWARD M.FLETCHER,JR.
Attesting Officer

ROBERT GOTTSCHALK
Commissioner of Patents